Sept. 17, 1935.     C. F. BURGESS     2,014,832
BATTERY
Filed Jan. 16, 1934

INVENTOR
Charles F. Burgess
BY
Pennie, Davis, Marvin & Edmonds
ATTORNEYS

Patented Sept. 17, 1935

2,014,832

UNITED STATES PATENT OFFICE 2,014,832

BATTERY

Charles F. Burgess, Bokeelia, Fla., assignor to Burgess Battery Company, Freeport, Ill., a corporation of Wisconsin Application January 16, 1934, Serial No. 706,826

11 Claims. (Cl. 136—108)

This invention relates to an improved multi-cell battery construction and relates specifically to the construction of multi-cell units used in such a battery in which cylindrical dry cells are connected in parallel.

It is an object of this invention to produce a multi-cell low voltage battery of the ordinary types of dry cells, and especially the so-called "pasted" or "bag-type" flashlight cell, which will occupy a minimum of space, will be of sturdy construction and which may be produced at a minimum cost. A low voltage battery of this construction has a number of advantages over the ordinary type of low voltage high capacity battery as exemplified by the standard paper-lined No. 6 cell. It allows a battery to be designed in which the individual cells may be discharged at the proper current density to attain the best efficiency.

The battery of this invention is designed especially for the low voltage "A" circuits of radio and like circuits and wherever a low voltage battery of high capacity is required. The individual cells thereof are therefore connected in parallel in contrast to the series connections in the ordinary multi-cell "B" batteries. Whereas in a "B" battery each cell must be insulated from the adjacent cell, it is not necessary to insulate the adjacent cells in a parallel connected multi-cell battery. In the series-connected "B" battery it has been general practice to use the so-called "egg-crate" construction which results in much waste space in the battery. In the parallel-connected battery of my invention in which the cells of any one unit are assembled in a close-packed arrangement, there is a minimum of waste space.

The specification is to be read in conjunction with the drawing which illustrates one form of my invention.

Figure 1:
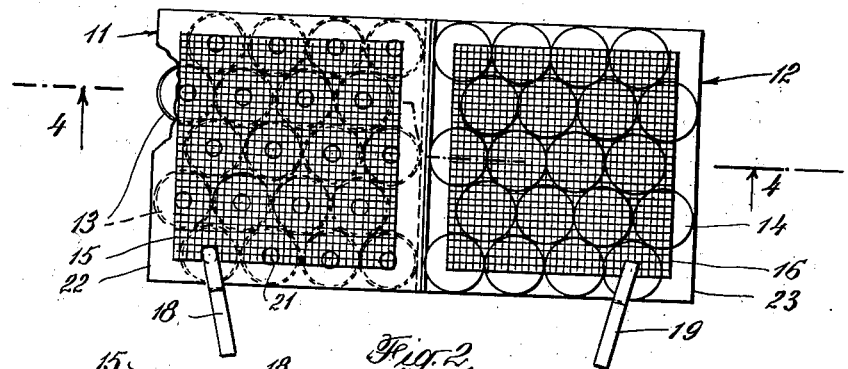
Fig. 1 is a top view of a battery consisting of two series-connected units of parallel-connected dry cells in a close-packed arrangement.
Figure 2:
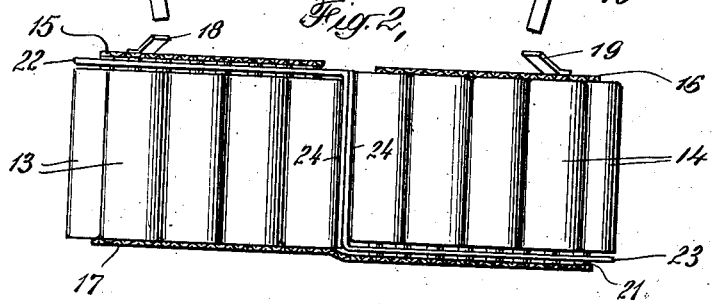
Fig. 2 is a side view.

The battery shown in Figs. 1 to 4 consists of two units 11 and 12 each of which respectively consists of a plurality of the ordinary cylindrical dry cells 13 and 14 connected in parallel by metallic conductive screens 15 and 16 respectively on one side thereof. This for convenience is called the top side of the battery. At the bottom of the battery one continuous conductive screen 17 connects all of the negative electrodes of the cells 13 of unit 11 to all of the positive electrodes of the cells 14 of unit 12 to thereby connect units 11 and 12 in series. The screens are conveniently connected to the electrodes by soldering. Terminal strips 18 and 19 are attached to screens 15 and 16. Terminal posts (not shown) are attached to these terminal strips when the units are encased in the conventional outer boxes (not shown) in the usual way and in which form they are sold to the consumer.

If the conventional LeClanche cell is used in my new battery it consists of a cylindrical zinc can 20 with a central positive brass capped carbon electrode 21. The screen connector connecting the brass caps comes in close proximity to the top edges of the zinc cans and there is danger of short circuiting occurring especially if the cells should ooze electrolyte between the top seal and zinc can. I therefore prefer to insert an insulating sheet, such as a paraffined chip-board, between the top edges of the zinc can and the screen or other sheet-like material which may be used to connect the positive electrodes. This insulation is preferably in the form of insulating sheets 22 and 23 with holes therein which register with the positive electrodes and which preferably form a frictional fit therewith. This perforated insulating sheet is forced down over the positive electrodes as shown. Where two adjacent units are used as shown the ends of the insulating sheets are turned down between the two units as shown at 24 to prevent short circuiting. The screen connector is soldered to the positive electrodes after the insulating sheet has been positioned as shown. The units thus assembled may be dipped into a bath of insulating material such as celluloid cement, asphalt or varnish to coat the individual cells with insulating material and thereby provide an air-tight receptacle should the zinc cans become perforated in service.

Figure 3:
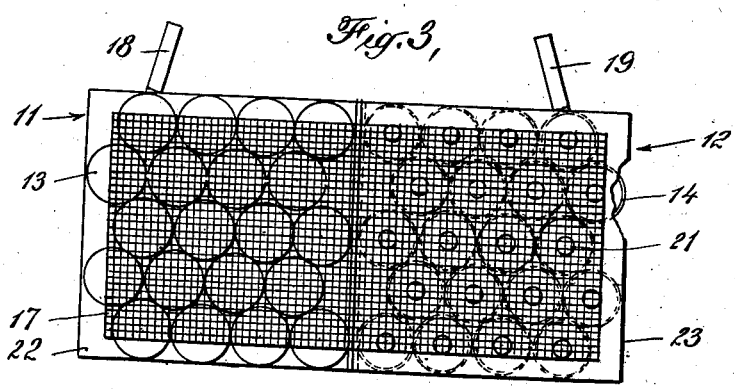
Fig. 3 is a bottom view.
Figure 4:
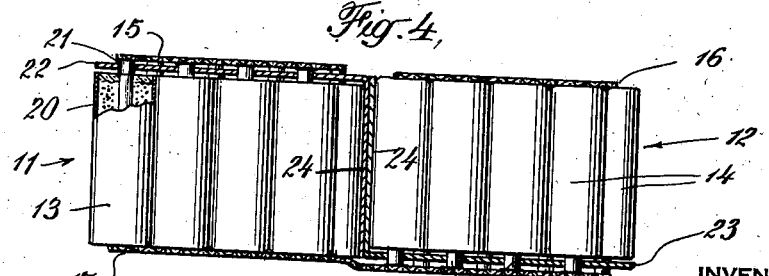
Fig. 4 is a sectional view on line 4—4 of Fig. 1.

In my novel battery the cells 13 and 14 constituting the battery units are not assembled in "egg-crates" but are assembled in close-packed arrangement as shown with the adjacent cans substantially in contact and with the corresponding cells of adjacent rows offset from one another a distance substantially equal to one-half the diameter of the cell (see Figs. 1 and 3). This arrangement produces a minimum of waste space. Any number of units may be assembled to form a battery of any capacity, size or voltage desired.

The sheet-like conductor is preferably flexible so that it may readily accommodate itself to any unevenness in the height of the individual cells. A screen such as is made of galvanized or tinned wire, preferably galvanized or tinned after weaving to provide positive electrical connection between the wires, is suitable. Thin sheet metal, preferably perforated so that the perforations register with the electrodes or a portion of each electrode, may be used. If at least one perforation registers with at least a portion of each electrode the soldering operation obviously is more readily performed. The advantages of this novel sheet-like connector in a multiple cell battery unit will be obvious to those skilled in the art.

The cells need not be dry cells but may be any type of current generating cell which may be assembled in the manner described. The negative electrode of the dry cell need not be made of zinc but may be made of other suitable metals such as magnesium or aluminum. The cells may be connected to the sheet-like conductor by a welding operation. The use of my novel sheet-like connectors is not limited to cells assembled in close-packed arrangement but may be used with cells assembled in separate compartments as in the standard "egg-crate". Instead of assembling two or more units in lateral relationship as shown in the drawing these may be assembled vertically, that is, by superimposing the units on each other and connecting them either in series or in parallel, as desired.

I claim:

1. A multi-cell battery comprising one or more units of parallel connected cells arranged in three or more adjacent rows of three or more cells, the terminals of said cells of one polarity being exposed on one side in any one unit of said battery and the terminals of said cells of opposite polarity being exposed at the opposite side of said unit of said battery, and a sheet-like conductor electrically connecting the terminals of one polarity on at least one side of said unit said conductor having an area sufficient to overlie said group of terminals of the same polarity.

2. The battery of claim 1 in which the sheet-like conductor is flexible.

3. The battery of claim 1 in which the sheet-like conductor is perforated sheet metal in which perforations register with at least a part of each of the terminals to which said sheet metal is connected.

4. The battery of claim 1 in which the sheet-like conductor is a metallic screen.

5. The battery of claim 1 in which the cells are dry cells comprising zinc containers with central positive terminals.

6. The battery of claim 1 in which the cells are dry cells comprising circular cans with central positive electrodes.

7. The battery of claim 1 in which the cells comprise circular cans in close-packed arrangement, the cans of adjacent cells being substantially in contact.

8. A multi-cell battery comprising one or more units of parallel connected cells arranged in a plurality of adjacent rows, said cells comprising metallic containers with electrodes of opposite polarity protruding above the tops of the open ends of said containers, all of the protruding electrodes of any one unit being exposed on one side of said unit, a sheet of insulating material with apertures therein which register with said protruding electrodes, said insulating sheet resting on the top ends of said containers with the other electrodes protruding through the apertures therein, and a sheet-like conductor electrically connecting the protruding electrodes said conductor having an area sufficient to overlie said group of electrodes of the same polarity.

9. A multi-cell battery comprising one or more units of parallel connected cells comprising circular cans with electrodes of opposite polarity protruding above the tops of the open ends of said cans, said cells being arranged in a plurality of adjacent rows in close-packed arrangement, the cans of adjacent cells being substantially in contact, all of the protruding electrodes of any one unit being exposed on one side of said unit, a sheet of insulating material with apertures therein which register with said protruding electrodes, said apertures being of such size that said protruding electrodes make a frictional fit when said electrodes are inserted into said apertures, said insulating sheet resting on the tops of said containers with the other electrodes protruding through the apertures therein and a sheet-like conductor electrically connecting the protruding electrodes.

10. In a battery connector, the combination with a plurality of cells arranged in adjacent, side by side arrangement and similar orientation, each cell having a terminal exposed at an end thereof to form a group of exposed terminals, of a conductor member comprising a sheet-like member of an area sufficient to overlie said group of terminals, said conductor member overlying and electrically connecting said group of exposed terminals.

11. A multi-cell battery comprising one or more units of parallel connected cells comprising circular cans arranged in a plurality of adjacent rows in close-packed arrangement, the cans of adjacent cells being substantially in contact, the electrodes of like polarity of any one unit being connected by a sheet-like conductor having openings therein registering with said electrodes, said conductor having an area sufficient to overlie said group of electrodes.

CHARLES F. BURGESS.